United States Patent [19]

Pryor et al.

[11] 3,837,895

[45] Sept. 24, 1974

[54] ORGANIC RESIN-GLASS-METAL COMPOSITE

[75] Inventors: Michael J. Pryor, Woodbridge; James M. Popplewell, Guilford, both of Conn.

[73] Assignee: Olin Corporation, New Haven, Conn.

[22] Filed: July 7, 1972

[21] Appl. No.: 269,869

Related U.S. Application Data

[63] Continuation-in-part of Ser. No. 78,899, Oct. 7, 1970, Pat. No. 3,676,292, and a continuation-in-part of Ser. No. 231,834, March 6, 1972, , and a continuation-in-part of Ser. No. 254,666, May 18, 1972.

[52] U.S. Cl. ............... 117/70 A, 117/70 C, 117/75, 117/129, 117/132 C, 117/132 CF, 161/189, 161/196, 220/64, 161/213
[51] Int. Cl. ........................... B44d 1/14, B44d 1/34
[58] Field of Search ............ 220/64; 117/70 C, 129; 7/75; 161/189, 196, 193, 213, 204

[56] References Cited
UNITED STATES PATENTS 3,271,653 9/1966 Wolf ..................................... 220/64
3,393,086 7/1968 Keating ............................... 220/64
3,473,952 10/1969 McFadden ........................... 220/64
3,480,461 11/1969 Lynge ............................... 117/70 C
3,511,690 5/1970 Aharoni .............................. 117/71
3,523,817 8/1970 Reiss .................................. 220/64
3,593,702 7/1971 Zigomalas ........................... 220/64

*Primary Examiner*—Daniel J. Fritsch
*Attorney, Agent, or Firm*—David A. Jackson

[57] ABSTRACT

A composite, the process of making the composite and articles formed of the composite. The composite comprises a copper base alloy component containing from about 2 to 12% aluminum and the balance essentially copper. A glass or ceramic component comprising a coating of a glass or ceramic frit covering from about 40 to 100% of the surface area of a major surface of the copper base alloy component. The glass or ceramic component is bonded to the copper base alloy component. A heat resistant organic resin coating is provided over the glass or ceramic component and the major surface of the copper base alloy component. The composite is particularly useful for cooking utensils.

31 Claims, 3 Drawing Figures

PATENTED SEP 24 1974 3,837,895

ORGANIC RESIN-GLASS-METAL COMPOSITE

CROSS REFERENCES TO RELATED APPLICATIONS

This application is a continuation-in-part of copending applications Ser. Nos. 78,899 now U.S. Pat. No. 3,676,292, filed Oct. 7, 1970; 231,834, filed Mar. 6, 1972; and 254,666, filed May 18, 1972.

BACKGROUND OF THE INVENTION

For many years, it has been known to employ composites comprising a heat resistant organic resin coating on a metal base, such as aluminum and stainless steel for cooking utensils. Pots and pans and other cooking utensils employing this composite enjoy nonsticking properties due to the resin coating which make them very easy to clean.

An improved composite for such use has also been employed wherein a glass frit is bonded to the metal base over a portion of its surface area and then the glass frit and metal base are coated with the organic resin. This composite when used for cooking utensils provides the added improvement of rendering the organic resin coating wear resistant.

In accordance with this invention it has been found that a specific group of copper base alloys having at least about 2 to 12 percent aluminum are well adapted to receive the combination glass frit organic resin coating.

The improved bond strength between the glass or ceramic frit and the copper base alloys in accordance with this invention provides a composite and articles formed therefrom having improved adherence and wear resistance of the resin coating. Cooking utensils formed of the inventive composite also have an aesthetically appealing appearance provided by the copper base alloy.

SUMMARY OF THE INVENTION

Therefore, in accordance with this invention, a composite is provided comprising a metal base of a copper base alloy containing from 2 to 12 percent aluminum, a coating of a glass or ceramic frit bonded to and covering at least 40 percent of the surface area of a major surface of the metal base and a coating of a heat resistant organic resin covering the glass or ceramic frit and the major surface of the metal base.

In accordance with another embodiment of the invention where it is desired to improve the tarnish resistance and/or change the color of the exposed copper base alloy surface opposing the resin coated surface, a layer of a glass or ceramic may be bonded to the exposed surface.

The aforenoted composites are adapted to be formed into a wide variety of kitchen utensils such as pots, pans and the like which therefore have the improved wear resistance and adherence of the resin coating exhibited by the composites. Further, the resulting kitchen utensils have an aesthetically appealing appearance provided by the copper base alloy.

It has been found that the copper base alloy component within certain ranges of composition in accordance with this invention forms on its surface an oxide layer, one component of which is $Al_2O_3$ in the form of a compact continuous film. The $Al_2O_3$ film forms immediately adjacent to the metal surface and is strongly adherent to it. The $Al_2O_3$ film comprises at least 10 percent of the total oxide film thickness.

When the glass or ceramic frit component is bonded to the copper base alloy component having the $Al_2O_3$ film, a strong bond results which provides in the final resin coated composite the marked improvement in wear resistance and adherence of the resin coating.

It is a principal object of this invention to provide a composite comprising a metal base of a copper base alloy, a glass or ceramic frit component coated over at least a portion of the surface area of a major surface of the metal base and strongly bonded to the metal base and a heat resistant organic resin component formed over the entire major surface of the metal base containing the glass or ceramic frit component.

It is another object of this invention to provide a composite as above further including a glass or ceramic component coated over the entire surface opposed to the resin coated surface of the metal base.

It is a further object of this invention to provide cooking utensils formed of the aforenoted composites.

It is a further object of this invention to provide a process for forming the aforenoted composites and cooking utensils.

Other objects and advantages will become apparent to those skilled in the art as a detailed description follows with reference to the drawings.

DESCRIPTION OF THE PREFERRED EMBODIMENTS

Figure 1:
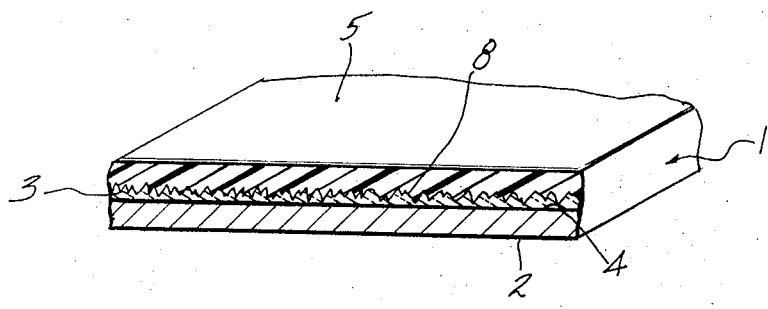
FIG. 1 shows a sectioned perspective view of a composite in accordance with one embodiment of the instant invention.

Referring now to the drawings and especially to FIG. 1, there is shown a composite 1 in accordance with the instant invention. The composite 1 comprises a metal base 2 or component which is a copper base alloy having from about 2 to 12% aluminum and the balance essentially copper.

Copper base alloys for use in the composite of this invention preferably contain from about 2 to 10% aluminum; from about 0.001 to 3% silicon, up to about 35% zinc, and a grain refining element selected from the group consisting of iron up to about 4.5%, chromium up to about 1%, zirconium up to about 0.5%, cobalt up to about 1% and mixtures of these grain refining elements.

In particular, C.D.A. Alloy 638 containing 2.5 to 3.1% aluminum, 1.5 to 2.1% silicon and 0.25 to 0.55% cobalt, balance essentially copper, and C.D.A. Alloy 688 containing 2.8 to 4.0% aluminum, 21 to 24.5% zinc and 0.1 to 1% cobalt, balance essentially copper are most preferred for use in the composites of this invention.

Impurities may be present in the copper base alloy component in amounts not adversely affecting its properties. In particular, the impurities may include less than 1% nickel, less than 1% manganese, less than 1% tin, less than 0.5% lead, less than 0.1% phosphorus and less than 1% arsenic. The aforenoted limitations on impurity elements apply to those elements only when they are present as impurities and not when they are used as alloying elements.

The aforenoted copper base alloys form on their exposed surfaces an oxide, one component of which is $Al_2O_3$ in the form of a thin compact continuous film. The $Al_2O_3$ film forms immediately adjacent to the metal, is strongly adherent to it and comprises at least about 10% and up to about 100% of the total thickness of the oxide.

Alumina seals efficiently to most glasses and ceramics. Therefore, since the alumina film formed on the alloys used with this invention is tightly adherent to the alloys, an excellent glass or ceramic-to-metal bond is produced.

The alumina film on the alloys in accordance with this invention may be formed by any conventional techniques as are known in the art. It may be formed during the coating of the alloy component with the glass or ceramic component or the alloy component may be preoxidized by conventional techniques such as heating the alloy component to a temperature in the range of 200° to 700°C for a period of time of at least 2 seconds. Normally, however, the alumina film is formed on the surface of the alloy component during the coating of the metal with the glass or ceramic.

Any well known glass or ceramic which will readily fuse with the alumina film on the metal surface may be used as the glass or ceramic component 3 in the composite of this invention. However, the mismatch in coefficient of expansion between the metal component and the glass or ceramic component should be less than $110 \times 10^{-7}$ in./in./°C, and preferably, less than $75 \times 10^{-7}$ in./in./°C and, most preferably, less than $60 \times 10^{-7}$ in./in./°C.

It is one of the unique aspects of the composite of this invention that it is able to tolerate a substantial mismatch in coefficient of expansion between the glass or ceramic component 3 and the metal component 2. If stronger and/or more elastic glasses or ceramics are developed even greater degrees of mismatch than above noted could be tolerated.

TABLE I lists various exemplary glasses and ceramics which are adapted for use in accordance with this invention.

It has been found that additions of 2 parts boric acid, 1.35 parts KOH, 9.3 parts potassium silicate, 0.5 parts silicic acid per 100 parts of the clear porcelain No. EN-701-A manufactured by the Ferro Corporation, Cleveland, Ohio is beneficial in accordance with this invention.

It has been found that various glasses and ceramics can be employed in this invention and the examples set forth in TABLE I are not meant to be limitive of the invention.

The glass or ceramic component 3 of the composite 1 of FIG. 1 comprises a coating of frit of any desired composition which covers from about 40 to 100% of the surface area of a major surface 4 of the metal component 2. In the composite 1 shown, the glass or ceramic covers the entire surface area of the major surface 4 of the metal component 2; however, in practice, it has been found that coverage of about 55 to 60% of the surface area is sufficient for most purposes.

The final component of the composite of FIG. 1 comprises a heat resistant organic resin 5 of a composition well known in the art for use in cooking utensils. For example, the resin may be a polyimide; a polymer of a halogenated ethylene or a halogenated propylene; or a silicone. A particularly preferred material comprises

TABLE I

| GLASS OR CERAMIC TYPE | COEFFICIENT OF THERMAL EXPANSION in./in./°C |
|---|---|
| MOST PREFERRED | |
| * CORNING - CODE No. 7047 (Barium Silicate Glass) | $140 \times 10^{-7}$ |
| * FERRO CORPORATION No. EN-701-A (Clear Porcelain) | approximately $160 \times 10^{-7}$ |
| * FERRO CORPORATION No. CN-500-A | |
| PREFERRED | |
| * OWENS - Illinois No. 00583 (Sealing Glass) | $117 \times 10^{-7}$ |
| ** BOROSILICATE CLEAR PORCELAIN 50% $SiO_2$, 20% $B_2O_3$, 12.5% Cryolite, 10% BaO, 2.5% ZnO, 2.5% $K_2O$, 2.5% $Na_2O$ | approximately $72 \times 10^{-7}$ |
| LEAST PREFERRED | |
| * G.E. - ReX (Sealing Glass) | $90 \times 10^{-7}$ |
| ** SODA - LIME - SILICA GLASS 70% $SiO_2$, 11% CaO, 14% $Na_2O$, + $Al_2O_3$ + MgO | $90 \times 10^{-7}$ |
| ** PORCELAIN 40% Leucite ($K_2O$, $Al_2O_3$, $4SiO_2$) 30% Mullite ($3Al_2O_3$, $2SiO_2$) 30% $SiO_2$ | $60 \times 10^{-7}$ |
| ** SEALING GLASS TYPE 101 ASTM No. F-79-67T 56% $SiO_2$, 1.5% $Al_2O_3$, 4.0% $K_2O$, 29.0% PbO | $92 \times 10^{-7}$ |

* Proprietary Composition
** Values in Weight Percent polytetrafluoroethylene; however, other similar fluorocarbons could be employed.

The aforenoted compounds comprise well known heat resistant organic resins and are meant to be exemplary of suitable resins 5 useful in accordance with this invention; however, the invention is not meant to be limited thereby. The heat resistant organic resin 5 is preferably heat curable as are the aforenoted exemplary compounds and further preferably it exhibits non-sticking qualities which make it useful as a readily cleanable cooking surface.

Figure 2:
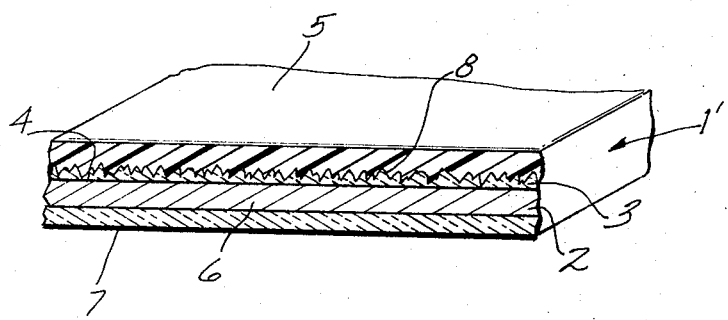
FIG. 2 shows a sectioned perspective view of a composite in accordance with another embodiment of the instant invention.

FIG. 2 shows a composite 1' in accordance with another embodiment of this invention. The composite 1' is similar to the composite 1 of FIG. 1 in that it includes a metal component 2, a first glass or ceramic component 3 and a heat resistant organic resin 5 component of the same character and type as described with reference to the composite 1 of FIG. 1. The composite of FIG. 2, however, includes a further or second glass or ceramic component 6 bonded to a major surface of the metal component 2 opposed to the resin coated surface 5 of the metal component.

This second glass or ceramic component 6 should preferably have a coefficient of thermal expansion close to that of the metal component 2 and have a softening temperature well above the temperatures to which it will be exposed to in use. Preferably, the second glass or ceramic component 6 should be transparent to allow the aesthetically pleasing appearance of the alloy component 2 to show through, however, it may be translucent or opaque in various colors if desired.

Additions of various compounds to glasses or ceramics are known to cause them to be tinted or colored and, therefore, it is possible to change the color exhibited by the composite surface 7 at the second glass or ceramic component 6 by the addition of such compounds to that glass or ceramic component 6.

These compounds may include but are not limited to $MnO_2$, $Fe_2O_3$, $Cu_2O$, $Co_2O_3$, $NiO$, $K_2Cr_2O_7$, $Na_2UO_4$, and combinations of these compounds in amounts from 0.1% to about 10% by weight. The use of such additions provides composite 1' surfaces 7 which vary in color depending on the glass or ceramic which is employed and the particular compounds added thereto. It is possible to obtain bronzes, greens, lavenders, blues, etc., and in particular, the addition of $MnO_2$ to the Borosilicate Clear Porcelain of TABLE I yielded a purple tint.

Figure 3:
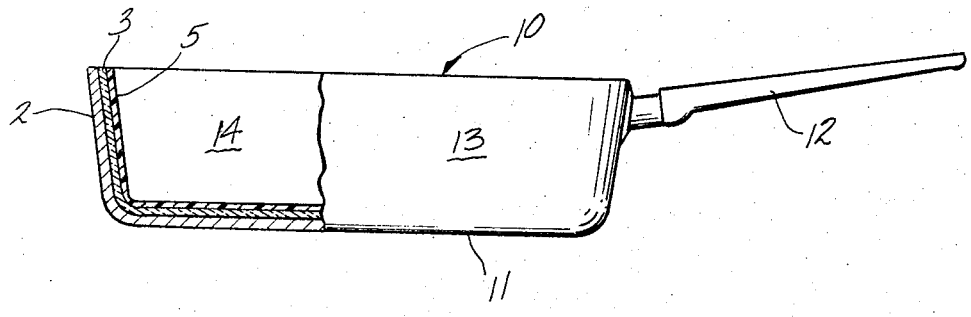
FIG. 3 shows a partially sectioned side view of an exemplary kitchen utensil formed of a composite in accordance with this invention.

The composites 1 and 1' of FIGS. 1 and 2 are uniquely adapted for use in cooking utensils and surfaces exposed to cooking environments. FIG. 3 shows an exemplary cooking utensil 10 employing the composite 1 of FIG. 1. The utensil 10 shown is an ordinary pot having a bowl shaped portion 11 and a handle 12 attached thereto. The structure of the pot, other than the use of the composites 1 or 1' of this invention for the bowl portion 11 is well known in the art and is not meant to be limitive of the invention.

The outside surface 13 of the bowl shaped portion 11 of the pot comprises the metal component 2 of the composite 1 of this invention. The inside surface 14 comprises the heat resistant organic resin component 5.

The pot shown in FIG. 3 is exemplary and the composites 1 and 1' of the instant invention can be employed in a wide variety of cooking utensils 10, including but not limited to pots, pans, griddles, baking pans, cookie sheets, cup cake pans, spatulas, mixing spoons, forks and other implements and the like.

The composites 1 and 1' of the instant invention provide an improved heat resistant organic resin surface 5 having improved scratch resistance and adherence due to the high bond strength of the glass or ceramic component 3 to the metal component 2 of the composites. The bond between the glass or ceramic component 3 and the metal component 2 is an interatomic bond by virtue of the solutionizing effect of the glass or ceramic on the alumina film which is present on the metal component 2.

The glass or ceramic component 3 surface 8 which is to be coated with the heat resistant organic resin component 5 has a considerable roughness since it is formed by firing a frit and, further, since the frit generally does not cover the entire major surface 4 of the metal component 2. Therefore, a good mechanical bond is obtained between the resin component 5 and the glass or ceramic component 3.

The process of forming the composites 1 and 1' of this invention comprises providing a copper base alloy component within the aforenoted ranges of composition having first and second major surfaces, the first and second major surfaces being in opposing relationship. The first major surface is then coated with a glass or ceramic frit covering from about 40 to 100% of the surface area of this surface and, preferably, from about 55 to 60%.

The glass or ceramic component is then bonded to the metal component, as by firing in a conventional manner at an appropriate temperature for the specific glass or ceramic involved. The first major surface of the metal component with the bonded glass or ceramic frit is then coated with a heat resistant organic resin followed by curing of the heat resistant organic resin to provide an adherent coating. If desired, the organic resin may be applied in more than one coat.

For example, an air dry primer coat may first be applied followed by the application of the top coating which is then cured. The curing is generally carried out at elevated temperatures. For an organic resin coating of polytetrafluoroethylene, a curing temperature of 800°F has been found to be quite suitable.

When the second glass or ceramic component is desired, it is applied and fired in a conventional manner.

EXAMPLE I

Samples of C.D.A. Alloy 638 and C.D.A. Alloy 688 were grit blasted to provide a clean surface and a uniform surface roughness. The grit blasted surfaces were first sprayed with Ferro Corporation CN-500-A frit at 55 to 60% coverage and fired for 4 minutes at 1,000°F in air. An air dry primer coat (0.2 – 0.4 mil thick) was applied followed by the application of the enamel top coat of polytetrafluoroethylene (0.8 – 1.0 mil thick). The top coat was baked for 20 minutes at 800°F.

The scartch resistance under a tool pressure of 30 psi for C.D.A. Alloy 638 and 36 psi for C.D.A. Alloy 688 was determined with a device similar to a ball point pen which was dragged across the resin coated surface of the metal. The load at which penetration occurs determines the ranking.

The samples were also subjected to a post oil adhesion test to simulate actual useage. The samples were heated in cooking oil at 400°F for 3 hours followed by dishwasher washing. The resin coated surface was then scratched and the amount of peel back of the resin component obtainable was measured on a relative scale (30 — no peel back, 0 – ¼ inch peel back).

Samples were also subjected to the standard cross hatch test for paints, etc., to determine adhesion. In this test, a razor blade was used to inscribe 100 cuts in three-fourths inch of resin coated surface with two series of cuts being made at right angles. Cellophane tape was then applied to the cross hatched area and then peeled off. Rankings are based on the number of squares of the resin component remaining in the cross hatched area after the tape has been peeled off, with 10 being the maximum.

The results of these tests are shown in TABLE II below.

TABLE II

| Alloy | Sample Number | Scratch Resistance | Post Oil Adhesion | Cross Hatch |
|---|---|---|---|---|
| Alloy 638 | 1 | 27 | 9 | 9.9 |
|  | 2 | 26 | 10 | 10 |
|  | 3 | 26 | 10 | 10 |
|  | 4 | >30 | 9 | 9.9 |
|  | 5 | 29 | 9 | 10 |
|  | 6 | >30 | 9 | 10 |
| Alloy 688 | 1 | 36 | 10 | 10 |
|  | 2 | 36 | 10 | 10 |
|  | 3 | 36 | 10 | 10 |
|  | 4 | 36 | 10 | 10 |
|  | 5 | 36 | 10 | 8 |
|  | 6 | 36 | 10 | 8 |
| Maximum Possible + |  | 36 | 10 | 10 |

The results tabulated above for both C.D.A. Alloys 638 and 688 are very good indicating that the composites 1 and 1' of the instant invention are highly effective for their intended purpose and are resistant to peeling and scratching and other abrasive effects. The scratch resistances particularly for Alloy 688 were excellent.

The post oil adhesion results were also excellent for both alloys indicating no deterioration of the bonds during use.

The cross hatch test results were also very good for both alloys.

The good performance of both of these alloys in the aforenoted tests are no doubt due to the ability of both of these alloys to seal effectively to the glass or ceramic component. This is significant since the effectiveness of this type of composite employing a metal base with a glass and resin coating relies on the underlying glass layer to provide both adhesion and wear resistance of the organic resin coating.

In most instances, the composite 1 of FIG. 1 would be favored for use in cooking utensils. The omission of the second glass or ceramic component 6 makes this composite cheaper to manufacture and the metal component 2 by virtue of the formation of the alumina film on its surface has excellent high temperature oxidation resistance. However, the composites 1 and 1' are amply suited for use in kitchen utensils and the like.

The composite 1' of FIG. 2 provides the added benefits of improved tarnish resistance for the metal component 2 and further allows the aesthetic appearance of the metal component to be altered as aforenoted to provide different colors as may be desired.

The composites 1 or 1' in accordance with this invention provide a further improvement when used in cooking utensils 10 in that the inherent high mechanical strength of the metal component 2 makes them highly dent resistant.

It is to be understood that this invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. A composite consisting essentially of:
   a copper base alloy component, said copper base alloy component comprising from about 2 to 12% aluminum and the balance essentially copper and having at least a first and a second major surface, said second major surface being in opposing relationship to said first major surface;
   a glass or ceramic component comprising a coating of a glass or ceramic frit covering from about 40 to 100% of the surface area of said first major surface, said glass or ceramic component being bonded to said copper base alloy component in a glass or ceramic-to-metal bond; and
   a heat resistant organic resin coating over said glass or ceramic component and said first major surface of said copper base alloy component.

2. A composite as in claim 1 wherein said copper base alloy component comprises from about 2 to 10% aluminum, from about 0.001 to 3% silicon, up to about 35% zinc, a grain refining element consisting essentially of iron up to about 4.5%, chromium up to about 1%, zirconium up to about 0.5%, cobalt up to about 1% and mixtures thereof.

3. A composite as in claim 2 wherein said heat resistant organic resin is a polyimide, a polymer of a halogenated ethylene or a halogenated propylene or a silicone.

4. A composite as in claim 2 wherein said copper base alloy consists essentially of 2.5 to 3.1% aluminum, 1.5 to 2.1% silicon, 0.25 and 0.55% cobalt, balance essentially copper.

5. A composite as in claim 4 wherein said heat resistant organic resin is a polyimide, a polymer of a halogenated ethylene or a halogenated propylene or a silicone.

6. A composite as in claim 2 wherein said copper base alloy consists essentially of 2.8 to 4.0% aluminum, 21 to 24.5% zinc and 0.1 to 1% cobalt balance essentially copper.

7. A composite as in claim 6 wherein said heat resistant organic resin is a polyimide, a polymer of a halogenated ethylene or a halogenated propylene or a silicone.

8. A composite as in claim 2 further including a glass or ceramic component bonded to said second major surface of said copper base alloy component.

9. A composite as in claim 4 further including a glass or ceramic component bonded to said second major surface of said copper base alloy component.

10. A composite as in claim 6 further including a glass or ceramic component bonded to said second major surface of said copper base alloy component.

11. A cooking utensil formed from a composite consisting essentially of:
   a copper base alloy component, said copper base alloy component comprising from about 2 to 12% aluminum and the balance essentially copper and having at least a first and a second major surface, said second major surface being in opposing relationship to said first major surface;
   a glass or ceramic component comprising a coating of a glass or ceramic frit covering from about 40 to 100% of the surface area of said first major surface, said glass or ceramic component being bonded to said copper base alloy component in a glass or ceramic-to-metal bond; and
   a heat resistant organic resin coating over said glass or ceramic component and said first major surface of said copper base alloy component, said heat resistant organic resin component comprising a cooking surface.

12. A cooking utensil as in claim 11 wherein said copper base alloy component comprises from about 2 to 10% aluminum, from about 0.001 to 3% silicon, up to about 35% zinc, a grain refining element consisting essentially of iron up to about 4.5%, chromium up to about 1%, zirconium up to about 0.5%, cobalt up to about 1% and mixtures thereof.

13. A cooking utensil as in claim 12 wherein said heat resistant organic resin is a polyimide, a polymer of a halogenated ethylene or a halogenated propylene or a silicone.

14. A cooking utensil as in claim 12 wherein said copper base alloy consists essentially of 2.5 to 3.1% aluminum, 1.5 to 2.1% silicon, 0.25 to 0.55% cobalt, balance essentially copper.

15. A cooking utensil as in claim 14 wherein said heat resistant organic resin comprises polytetrafluoroethylene.

16. A cooking utensil as in claim 12 wherein said copper base alloy consists essentially of 2.8 to 4.0% aluminum, 21 to 24.5% zinc and 0.1 to 1% cobalt balance essentially copper.

17. A cooking utensil as in claim 16 wherein said heat resistant organic resin component comprises polytetrafluoroethylene.

18. A cooking utensil as in claim 12 further including a glass or ceramic component bonded to said second major surface of said copper base alloy component.

19. A cooking utensil as in claim 14 further including a glass or ceramic component bonded to said second major surface of said copper base alloy component.

20. A cooking utensil as in claim 16 further including a glass or ceramic component bonded to said second major surface of said copper base alloy component.

21. A process of forming a composite comprising:
   providing a copper base alloy component comprising from about 2 to 12% aluminum and the balance essentially copper, said copper base alloy component having first and second major surfaces, said second major surface being opposed to said first major surface;
   coating said first major surface of said copper base alloy component with a glass or ceramic component, said glass or ceramic being a frit covering from about 40 to 100% of the surface area of said first major surface;
   joining said glass or ceramic component to said copper base alloy component in a glass or ceramic-to-metal bond;
   coating said first major surface and said glass or ceramic component with a heat resistant organic resin component; and
   curing said heat resistant organic resin component at an elevated temperature.

22. A process as in claim 21 wherein said copper base alloy component comprises from about 2 to 10% aluminum, from about 0.001 to 3% silicon, up to about 35% zinc, a grain refining element consisting essentially of iron up to about 4.5%, chromium up to about 1%, zirconium up to about 0.5%, cobalt up to about 1% and mixtures thereof.

23. A process as in claim 22 wherein said heat resistant organic resin component is a polyimide, a polymer of a halogenated ethylene or a halogenated propylene or a silicone.

24. A process as in claim 22 wherein said copper base alloy consists essentially of 2.5 to 3.1% aluminum, 1.5 to 2.1% silicon, 0.25 to 0.55% cobalt, balance essentially copper.

25. A process as in claim 24 wherein said heat resistant organic resin comprises a polytetrafluoroethylene.

26. A process as in claim 22 wherein said copper base alloy consists essentially of 2.8 to 4.0% aluminum, 21 to 24.5% zinc and 0.1 to 1% cobalt, balance essentially copper.

27. A process as in claim 26 wherein said heat resistant organic resin comprises a polytetrafluoroethylene.

28. A process as in claim 22 further including a glass or ceramic component bonded to said second major surface of said copper base alloy component.

29. A process as in claim 24 further including a glass or ceramic component bonded to said second major surface of said copper base alloy component.

30. A process as in claim 26 further including a glass or ceramic component bonded to said second major surface of said copper base alloy component.

31. A process as in claim 21 wherein said composite is formed into a cooking utensil.

* * * * *